(12) United States Patent
Mostofi et al.

(10) Patent No.: US 11,764,420 B2
(45) Date of Patent: Sep. 19, 2023

(54) BATTERY MODULE OF A HIGH-VOLTAGE BATTERY FOR AN ELECTRIC VEHICLE

(71) Applicant: Dr. Ing. h.c. F. Porsche Aktiengesellschaft, Stuttgart (DE)

(72) Inventors: Sascha Mostofi, Zeltingen (DE); Philipp Kellner, Renningen (DE)

(73) Assignee: Dr. Ing h. c. F. Porsche AG, Stuttgart (DE)

( * ) Notice: Subject to any disclaimer, the term of this patent is extended or adjusted under 35 U.S.C. 154(b) by 637 days.

(21) Appl. No.: 16/870,887

(22) Filed: May 8, 2020

(65) Prior Publication Data

US 2020/0358061 A1    Nov. 12, 2020

(30) Foreign Application Priority Data

May 9, 2019   (DE) ..................... 10 2019 112 058.6

(51) Int. Cl.
| | | |
|---|---|---|
| *H01M 10/625* | (2014.01) | |
| *B60L 50/64* | (2019.01) | |
| *B60L 58/24* | (2019.01) | |
| *H01M 10/6568* | (2014.01) | |
| *H01M 50/209* | (2021.01) | |
| *H01M 50/293* | (2021.01) | |
| *H01M 50/227* | (2021.01) | |

(Continued)

(52) U.S. Cl.
CPC ........... *H01M 10/625* (2015.04); *B60L 50/64* (2019.02); *B60L 58/24* (2019.02); *H01M 10/6568* (2015.04); *H01M 50/209* (2021.01); *H01M 50/211* (2021.01); *H01M 50/213* (2021.01); *H01M 50/227* (2021.01); *H01M 50/293* (2021.01); *H01M 2220/20* (2013.01)

(58) Field of Classification Search
CPC ......... H01M 10/6568; H01M 10/6566; H01M 10/625

See application file for complete search history.

(56) References Cited

U.S. PATENT DOCUMENTS

| | | | | |
|---|---|---|---|---|
| 8,722,223 | B2 * | 5/2014 | Yang .................. | H01M 10/613 429/156 |
| 2012/0156543 | A1 * | 6/2012 | Cicero .............. | H01M 10/0481 429/120 |

FOREIGN PATENT DOCUMENTS

| | | |
|---|---|---|
| DE | 10 2007 010 751 | 8/2008 |
| DE | 10 2010 051 010 | 5/2012 |
| DE | 10 2012 018 036 | 3/2014 |

(Continued)

*Primary Examiner* — Maria Laios
*Assistant Examiner* — Jordan E Berresford
(74) *Attorney, Agent, or Firm* — Gerald E. Hespos; Michael J. Porco

(57) ABSTRACT

A battery module (1) for an electric vehicle has battery cells (3) stacked behind one another to form a battery cell package (4) in a multipart battery module housing (2). An end plate (5) is on an end of the battery cell package (4). The battery module housing (2) has a central portion (6) and a housing end plate (7) at an end of the central portion (6). A gap (9) between the battery cell package (4) and an inner surface of the central portion (6) is filled with a thermally conductive medium. The end plate (5) has a spraying point (11) for introducing the thermally conductive medium and a distribution channel (10) for guiding the thermally conductive medium from the spraying point (11) into spaces between the battery cell package (4) and the inner surface of the central portion (6).

17 Claims, 1 Drawing Sheet

(51) Int. Cl.
*H01M 50/211* (2021.01)
*H01M 50/213* (2021.01)

(56) References Cited

FOREIGN PATENT DOCUMENTS

DE  10 2013 016 794   4/2015
DE  10 2014 211 032   12/2015

* cited by examiner

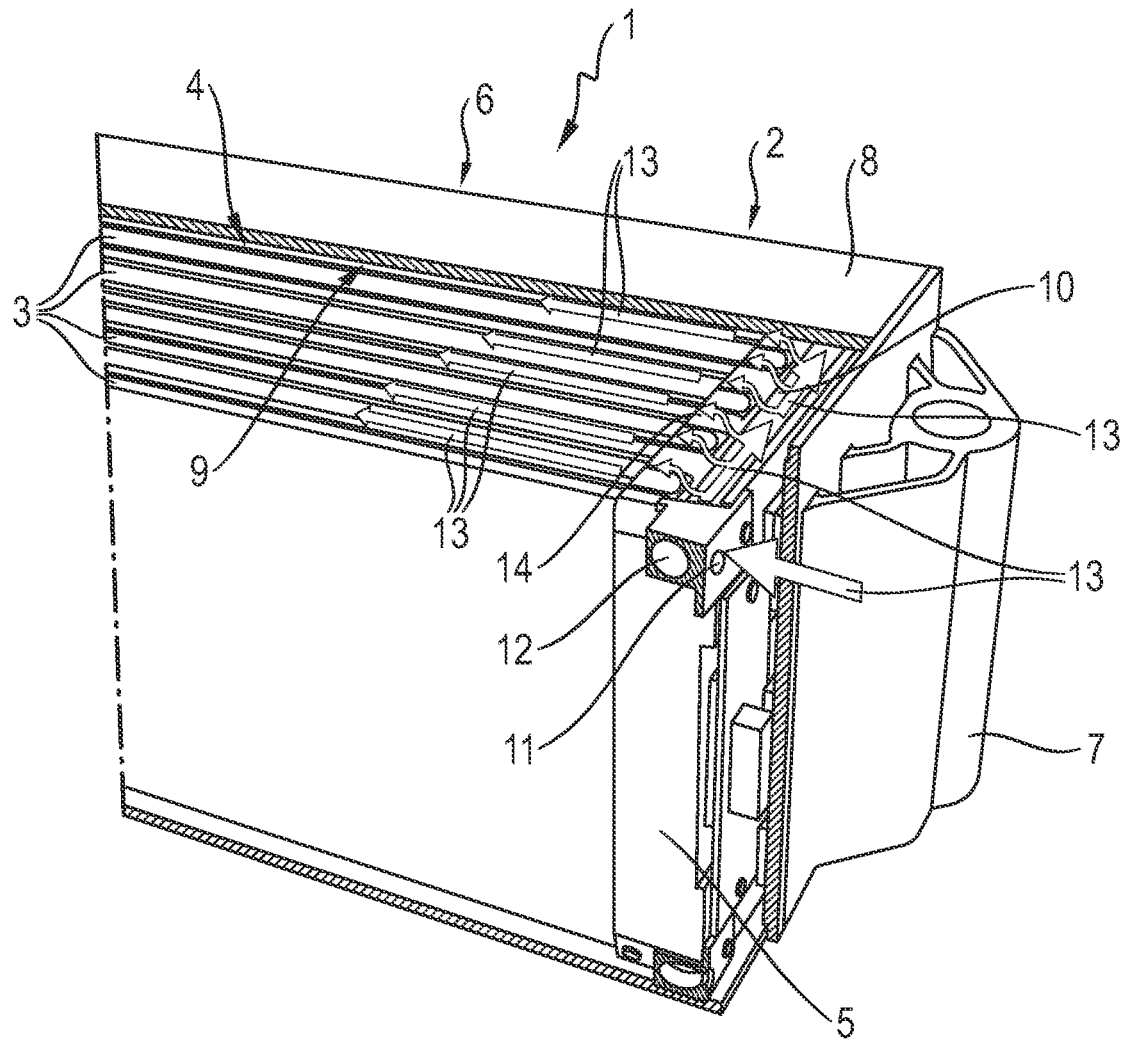
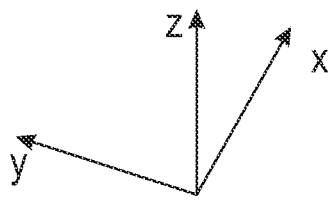

BATTERY MODULE OF A HIGH-VOLTAGE BATTERY FOR AN ELECTRIC VEHICLE

CROSS REFERENCE TO RELATED APPLICATION

This application claims priority under 35 USC 119 to German Patent Appl. No. 10 2019 112 058.6 filed on Sep. 5, 2019, the entire disclosure of which is incorporated herein by reference.

BACKGROUND

Field of the Invention

The invention relates to a battery module of a high-voltage battery for an electric vehicle where electrically interconnected battery cells are stacked behind one another to form a battery cell package arranged in a multipart battery module housing.

Related Art

Electric vehicles that are able to be driven electrically or partly electrically have numerous battery cells connected together to form a traction battery. Such a high-voltage overall battery consists of more than one hundred battery cells, and in some cases up to several thousand battery cells. The battery cells of the traction battery are connected together to form battery modules, and therefore subgroups. The modules usually have identical numbers of battery cells.

High-voltage batteries for electric vehicles require efficient cooling. According to the prior art, cooling usually is implemented only on one side and by separate cooling channels outside the battery modules.

Temperature control of battery modules also may include heating. Thus, batteries can be operated in an optimum temperature range even at low ambient temperatures. The following temperature controls apply equally to cooling or heating a battery.

DE 10 2012 018 036 A1 describes a battery module with a battery cell package and a stack housing for receiving stacked battery cells. An upper end cover enables a central portion of the stack housing to be closed off. Foamed plastic is sprayed into a space between an inner surface of the central portion and the battery cell package via openings provided in the central portion. This foamed plastic may be polyurethane foam or another foamed plastic based on silicone or artificial resins. The sprayed-in foamed plastic allows stacked individual cells or frames of the individual cells to be braced securely and reliably and fastened in the stack housing. At the same time, due to its elasticity, the foamed plastic allows compensation of manufacturing tolerances and different linear thermal expansions of the individual elements.

DE 10 2013 016 794 A1 describes a battery module with a battery cell package having pouch cells that are clamped in a frame. An electrically insulating filler material is arranged in a cavity between the pouch cells and the frame. The filler material is a thermoplastic and/or a casting compound and functions to stabilize the components of the battery module.

DE 10 2014 211 032 A1, DE 10 2007 010 751 A1 and DE 10 2010 051 010 A1 disclose batteries having a multiplicity of battery cells that are arranged in a battery housing. The battery cells are cast in the battery housing by a casting compound.

An object of the invention is to develop a battery module such that good temperature control efficiency of the battery module is ensured with simple, inexpensive manufacturing of the battery module.

SUMMARY

A battery module in accordance with an aspect of the invention has a battery cell package end plate arranged on at least one axial end of the battery cell package. The battery module housing has a central portion and a housing end plate arranged on the central portion at least at one end of the central portion. A gap is formed between the battery cell package and an inner surface of the central portion and is filled with a thermally conductive medium. The battery cell package end plate has a distribution channel for the thermally conductive medium and a spraying point for introducing the thermally conductive medium. The thermally conductive medium is guided from the spraying point into the distribution channel and is introduced between the battery cell package and the inner surface of the central portion over the width of the central portion via the distribution channel.

This battery module ensures reliable introduction of the thermally conductive medium into the battery module and ensures thermal contact with the entire surface to be contacted. Heat thus can be transferred optimally between the battery cells of the battery cell package and the battery module housing. The design of the distribution channel ensures that there is no high pressure acting on the battery cells when the thermally conductive medium is introduced into the battery module. The design of the battery module makes it possible to introduce a highly thermally conductive, highly viscous thermally conductive medium in a manner suitable for large-scale production, without in the process loading the sensitive battery cells with too much pressure or temperature.

The battery module with the above described the distribution channel enables output the thermally conductive medium, over the width of the central portion, into the gap between the battery cell package and the inner surface of the central portion. In view of this distribution, the gap can be kept very small. Controlling the temperature of the battery is more efficient and more effective with the smaller gap filled with the thermally conductive medium or the better the thermal conduction of the thermally conductive medium or the larger the surface area able to be used for temperature control. Multi-sided temperature control is preferred in this respect. However, the smaller the gap to be filled with thermally conductive medium, the lower the viscosity of the thermally conductive medium has to be to reliably fill the gap, or the higher the pressure at which the thermally conductive medium is introduced has to be. The design of the spraying point and the distribution channel allows a relatively high-viscosity thermally conductive medium to be introduced into the gap at a relatively high pressure.

The central portion may have a further housing end plate on the end facing away from the housing end plate, and the further housing end plate may have a spraying point and a distribution channel, as described above.

The distribution channel may be perpendicular to the spraying point. Thus, the thermally conductive medium that is introduced into the distribution channel in the region of the spraying point undergoes a 90° deflection.

The thermally conductive medium may be output in an aligned manner from the distribution channel into the gap between the inner surface of the central portion and the battery cell package over the entire length of the distribution channel, and the output may be substantially perpendicular to the flow through the distribution channel with respect to the main flow in the distribution channel.

The spraying point and the distribution channel may be next to the battery cell package, with respect to a longitudinal direction of the battery module.

The respective battery cell package end plate preferably consists of or comprises plastic.

The battery cell package may have a battery cell package end plate on each of the averted sides of the battery cell package.

The spraying point may be integrated into a battery cell package end plate or connected thereto.

The distribution channel and/or the deflection between the spraying point and the distribution channel may be integrated into the battery cell package end plate or connected thereto.

The spraying point of one embodiment comprises a docking port or a docking receptacle for a metering system nozzle to introduce the thermally conductive medium. The spraying point may have a round hole as docking receptacle.

The inner cross section of the distribution channel may be larger than the gap to be filled with thermally conductive medium between the battery cell package and the central portion of the battery module housing. The distribution channel may have a considerably larger inner cross section/diameter than the gap to be filled.

A half-channel in the battery cell package end plate may form the distribution channel and may be open toward the central portion.

The distribution channel of some embodiments has a large, wide but narrow opening toward the space between the battery cell package and the central portion of the battery module housing, thus toward the gap.

The spraying point may be capable of being closed off, for example, by way of one of the housing end plates. The spraying point may be closed off subsequently by parts of the battery module housing when the battery module is assembled, in particular by the end plate, a head plate or a cooling metal sheet.

The central portion may be a hollow body with a rectangular cross section. In this aspect, it is considered to be particularly advantageous if the thermally conductive medium is arranged in the gap between the central portion and the battery cell package on one side of the battery module housing or is arranged in the gaps between the central portion and the battery cell package on two opposing sides of the battery module housing, or is arranged in the gaps between the central portion and the battery cell package on three sides of the battery module housing, or is arranged in the gaps between the central portion and the battery cell package on all four sides of the battery module housing.

The central portion of the battery module housing may have a battery temperature control system integrated into the battery module housing. This system may use a coolant may use water mixture, an oil mixture or other cooling means.

Sealing elements, such as rubber lips or rubber seals may be provided to ensure that the pasty thermally conductive medium flows only where it is intended to create thermal contact between the battery cell package and the battery module housing. Thus, the deflection and/or the distribution channel may be sealed off.

The central portion of the battery module housing may be formed from an extruded battery module housing profile and/or a battery module housing profile manufactured in a continuous production process. This battery module housing profile may have channels that carry media to control the temperature of the battery cells. The profile of some embodiments is an aluminum extruded profile.

As an alternative, the central portion of the battery module housing may comprise an extruded battery module housing profile and/or a battery module housing profile manufactured in a continuous production process, in particular an aluminum extruded profile, that does not have any channels to carry media to control the temperature of the battery cells. Instead, the cooling channels may be formed by additional components that are connected thermally and mechanically to the battery module housing profile.

The battery cells used in the battery modules of certain embodiments are pouch cells, round cells or prismatic cells. Pouch cells are preferred in this case. The battery cells are arranged to stand next to one another and may be arranged with their current terminals being lateral in the vehicle transverse direction.

The thermally conductive medium is, for example, a thermally conductive paste.

The battery module according to the invention affords a considerable improvement in cooling efficiency, simplified and inexpensive production, high process safety without air inclusions, an inexpensive implementation suitable for large-scale production, multi-side temperature control, quick charging, an improved service life of the battery cells and a low installation space requirement.

Further features of the invention will become apparent from the claims, the attached drawing and the description of the exemplary embodiment that is reproduced in the drawing, without being restricted thereto.

BRIEF DESCRIPTION OF THE DRAWINGS

FIG. 1 shows a perspective view, partly in section, illustrating a battery module cut into various planes of a high-voltage battery, which is a traction battery for use in an electric vehicle.

DETAILED DESCRIPTION

The battery module 1 has a multipart battery module housing 2 in which a multiplicity of electrically interconnected battery cells 3 are stacked one behind another to form a battery cell package 4.

Battery cell package end plates are arranged on axial ends of the battery cell package 4, only one of these battery cell package end plates 5 being illustrated here.

The battery module housing 2 has a central portion 6 and housing end plates arranged on the central portion 6 on averted ends of the central portion 6 and connected thereto, only one of these housing end plates 7 being shown here. The respective housing end plate is connected, in particular screwed, to the central portion 6, and they are sealed off from one another.

A gap 9 is formed between the battery cell package 4 and a bottom side of an upper wall section 8 of the central portion 6, and hence on an inner surface of the central portion 6. The gap 9 is filled with a thermally conductive medium.

The battery cell package end plate 5 has a distribution channel 10 for the thermally conductive medium. The battery cell end plate 5 also has a spraying point 11 for introducing the thermally conductive medium into the distribution channel 10. The thermally conductive medium is a highly viscous thermally conductive paste when it is injected. More particularly, the thermally conductive medium is guided from the spraying point 11 into the distribution channel 10 and in the process is deflected by 90° from a horizontal longitudinal direction into a horizontal lateral direction. The thermally conductive medium is introduced, over the width of the central portion 6, seen in the X direction, corresponding to the width of the battery cell end plate 5 in this X direction, between the battery cell package 4 and the central portion 6 via the distribution channel 10.

The thermally conductive medium is deflected from the spraying point 11 to the distribution channel 10 by way of a deflection 12.

The spraying point 11 and the distribution channel 10 are arranged next to the battery cell package 4 with respect to a longitudinal extent of the battery module 1 in the transverse direction Y of the vehicle.

The respective battery cell package end plate consists of plastic. The spraying point 11 has a docking receptacle for a metering system nozzle to introduce the thermally conductive medium. The spraying point is a round hole.

The inner cross section of the distribution channel 10 is larger than the gap 9 to be filled with the thermally conductive medium between the upper wall 8 of the central portion 6 and the battery cell package 4. The distribution channel 10 is an upwardly open half-channel in the battery cell package end plate 5. The open half-channel is thus open toward the central portion 6, specifically toward the upper wall 8. The arrows 13 show the path of the thermally conductive medium when the battery module 1 is being filled. More particularly, the thermally conductive medium initially travels in the Y direction through the spraying point 11 to the deflection 12, then travels in the X direction into the distribution channel 10, over the entire width of the distribution channel 10, and then travels in the Y direction from an edge region 14 of the battery cell end plate 5 that delimits the distribution channel 10 into the gap 9 between the upper wall 8 and the battery cell package 4 to the other battery cell package end plate (not illustrated). The thermally conductive medium thus fills the gap 9 between the two battery cell package end plates 5 and between the battery cell package 4 and the upper wall 8.

After filling, the spraying point 12 is closed off by way of the housing end plate 7, which is screwed to the central portion 6. Sealing elements, such as rubber lips or rubber seals, are provided to ensure that the pasty thermally conductive medium flows only where it is intended to create thermal contact between the battery cell package 4 and the battery module housing 2, the deflection and/or the distribution channel 10.

The battery module housing 2 is in particular an aluminum extruded profile that has channels that carry media to control the temperature of the battery cells 3 that extend in the Y direction. These channels are flowed through by temperature control means, for example a water mixture, oil mixture or cooling means.

The battery cells 3 are pouch cells. The pouch cells are arranged standing above one another and have current terminals are arranged laterally in the vehicle direction Y.

What is claimed is:

1. A battery module of a high-voltage battery for an electric vehicle, comprising:
   a battery module housing having a central portion with opposite axial ends spaced apart in a longitudinal direction and an upper wall extending between the ends;
   electrically interconnected battery cells stacked one behind another to form a battery cell package arranged in the central portion of the battery module housing with a gap defined between the battery cell package and the upper wall of the central portion of the battery module housing;
   at least one battery cell package end plate arranged on at least one of the axial ends of the central portion of the battery module housing, the at least one battery cell package end plate having a spraying-in point and a distribution channel that communicates with both the spraying-in point and with the gap, a side of the distribution channel that communicates with the gap defining a cross section that is larger than a cross section of the gap;
   a thermally conductive medium held in the distribution channel and the gap between the battery cell package and the upper wall of the central portion; and
   at least one housing end plate mounted to the at least one battery cell package end plate and closing the spraying-in point to keep the thermally conductive medium in thermal contact with the upper wall of the central portion.

2. The battery module of claim 1, wherein the at least one battery cell package end plate comprises first and second battery cell package end plates arranged respectively on the opposite axial ends of the central portion of the battery module housing.

3. The battery module of claim 2, wherein the at least one housing end plate comprises first and second housing end plates mounted on respectively first and second battery cell package end plates.

4. The battery module of claim 1, wherein the distribution channel is perpendicular to the spraying-in point.

5. The battery module of claim 1, wherein the spraying-in point and the distribution channel are arranged next to the battery cell package with respect to the longitudinal direction of the battery module housing.

6. The battery module of claim 1, wherein the battery cell package end plate consists of plastic.

7. The battery module of claim 1, wherein the spraying-in point has a docking receptacle for a metering system nozzle to introduce the thermally conductive medium.

8. The battery module of claim 7, wherein the spraying-in point has a round hole as docking receptacle.

9. The battery module of claim 1, wherein the distribution channel is open continuously along a side of the distribution channel facing toward the central portion to define a part of the distribution channel that communicates with the gap.

10. The battery module of claim 1, wherein the central portion is a hollow body with a rectangular cross section.

11. The battery module of claim 10, wherein the central portion of the battery module housing further has a lower wall opposite the upper wall, gaps being defined between the battery cell package and each of the upper and lower walls of the central portion of the battery module housing, the thermally conductive medium being arranged in the gaps between the upper and lower walls of the central portion and the battery cell package.

12. The battery module of claim 11, wherein the central portion of the battery module housing further has opposite first and second side walls extending between the upper and lower walls, a first side gap being defined between the battery cell package and the first side wall of the central portion of the battery module housing, the thermally conductive medium being arranged in the first side gap between the first side wall of the central portion and the battery cell package.

13. The battery module of claim 12, further comprising a second side gap between the battery cell package and the second side wall of the central portion of the battery module housing, the thermally conductive medium being arranged in the second side gap between the second side wall of the central portion and the battery cell package.

14. The battery module of claim 1, wherein the central portion has channels integrated therein for carrying medium to control the temperature of the battery cells.

15. The battery module of claim 1 further comprising additional components that are connected thermally and mechanically to the battery module housing for carrying media to control a temperature of the battery cells.

16. The battery module of claim 1, wherein the battery cells are pouch cells, round cells or prismatic cells.

17. The battery module of claim 1, wherein the thermally conductive medium is a thermally conductive paste.

* * * * *